United States Patent Office 3,031,488
Patented Apr. 24, 1962

3,031,488
NEW COMPOUNDS OF O,O'-DIALKYLTHIOPHOSPHORIC ACIDS AND A PROCESS FOR THEIR PRODUCTION
Heinz Pohlemann and Harald Schroeder, Ludwigshafen (Rhine), Herbert Stummeyer, Mannheim, and Heinrich Adolphi, Limburgerhof, Germany, assignors to Badische Anilin- & Soda-Fabrik Aktiengesellschaft, Ludwigshafen (Rhine), Germany
No Drawing. Filed Mar. 18, 1958, Ser. No. 722,124
Claims priority, application Germany Mar. 20, 1957
6 Claims. (Cl. 260—461)

This invention relates to new compounds of O,O'-dialkylthiophosphoric acids, characterized by good insecticidal action and a process for their production.

It is already known that neutral esters of orthophosphoric or thiophosphoric acid are obtained by allowing phosphorus oxyhalides, monochlorides or dichlorides of alkoxyphosphoric acids or the corresponding thiophosphorus compounds to react with compounds containing hydroxyl groups, as for example alcohols or phenols. Compounds of this kind have already been prepared in large numbers and exhibit insecticidal, fungicidal or rodenticidal activity of varying degrees of intensity.

We have now found that a new class of dialkylthiophosphoric acid compounds is obtained by reacting a dialkylthiophosphoric acid halide of the general formula:

$$\begin{array}{c} R_1O \\ \phantom{R_1O} \diagdown \\ \phantom{R_1O} \phantom{\diagdown} P = S \\ \phantom{R_1O} \diagup \\ R_2O \phantom{\diagdown} Hal \end{array}$$

in which $R_1$ and $R_2$ are alkyl radicals and Hal is a halogen atom with a dicarboxylic acid of the general formula:

$$\begin{array}{c} \phantom{xx} COOH \\ \phantom{xx} \diagup \\ (CY_2)_n \\ \phantom{xx} \diagdown \\ \phantom{xx} COOH \end{array}$$

or a salt thereof, in which $n$ represents a number from 0 to 6 and Y hydrogen, alkyl, aryl or/and cycloalkyl radicals and/or halogen.

The reaction products correspond to the following general formula:

$$\begin{array}{c} R_1O \phantom{xx} S \\ \phantom{R_1O} \diagdown \| \\ \phantom{R_1O} P-O-C-(CY_2)_n-C-OR_3 \\ \phantom{R_1O} \diagup \phantom{xx} \| \phantom{xxxxxx} \| \\ R_1O \phantom{xxxxx} O \phantom{xxxxx} O \end{array}$$

in which $R_1$, $R_2$ and $n$ have the above significance, $R_3$ represents hydrogen or a dialkoxythiophosphoric acid radical, and in which Y represents hydrogen, alkyl, aryl and/or cycloalkyl radical and/or a halogen atom. $R_1$ and $R_2$ are preferably lower saturated alkyl radicals. Y represents preferably hydrogen, halogen and alkyl radicals having from 1 to 4 carbon atoms, i.e. methyl, ethyl, propyl and butyl radicals.

Halides of O,O'-dialkylthiophosphoric acids suitable for the reaction are for example dimethoxy-, diethoxy-, dipropoxy- and dibutoxy-phosphoric or -thiophosphoric acid chloride, bromide or iodide.

Suitable dicarboxylic acids are for example oxalic acid, malonic acid, dimethylmalonic acid, chlormalonic acid, dichlormalonic acid, bromomalonic acid, dibromomalonic acid, succinic acid, chlorsuccinic acid, glutaric acid, alpha-methyl-glutaric acid, adipic acid, methyladipic acid and suberic acid. The dicarboxylic acids may be used in form of their salts. It is preferable to use the alkali, alkaline earth or lead salts.

In the reaction there may be used either equivalent amounts of the initial materials, but also more than one equivalent of dialkylthiophosphoric acid halide may be allowed to act on one mol of the dicarboxylic acid. There are thus obtained, depending on which dicarboxylic acid is used as initial material, corresponding compounds which contain in combination one or two molecules of the dialkylthiophosphoric acid. It is also possible to proceed by using the dicarboxylic acid components in excess.

The reaction is preferably carried out in the presence of a solvent, for example a hydrocarbon, such as petroleum ether, cyclohexane, benzene or toluene, or a chlorohydrocarbon, such as methylene chloride. Ethers, for example tetrahydrofurane or dioxane, and also ketones, as for example acetone or methyl ethyl ketone, may also be added as solvents. Alcohols, for example ethanol, may also be used.

Although the reaction proceeds even in the cold, it is preferable to work at elevated temperatures. In general the reaction proceeds between −10° and 120° C., advantageously between 20° and 60° C. The hydrogen halide formed is advantageously bound by the addition of agents which bind hydrogen halide, as for example tertiary amines, such as triethylamine or pyridine or by alkali carbonate or alkali bicarbonate. The liquid base may wholly or partly replace the solvent otherwise necessary. When using salts of the dicarboxylic acids, it is not necessary to add additional agents which bind hydrogen halide.

The substances accessible for the first time according to this invention are in general characterized by a good insecticidal action with a low toxicity to warm-blooded animals.

The following table exhibits the results of tests made on house flies (*Musca domestica*) and plant lice (*Tetranychus urticae*) with the substances obtained according to Examples 1 to 8.

TABLE

| Example | *Musca domestica* LD 50 after 4 hours by application to the ventral abdomen of each fly of 1 mm.³ of an acetonic solution active substance (percentages) | *Tetranychus urticae* on bean plants complete destruction on spraying with aqueous emulsions of the active substances (percentages) |
|---|---|---|
| 1 | 0.0098 | 0.02 |
| 2 | 0.0083 | 0.04 |
| 3 | 0.0076 | 0.04 |
| 4 | 0.0112 | 0.04 |
| 5 | 0.0077 | 0.05 |
| 6 | 0.0133 | 0.1 |
| 7 | 0.0137 | 0.1 |
| 8 | 0.0079 | 0.05 |

The following examples will further illustrate this invention but the invention is not restricted to these examples. The parts specified in the examples are parts by weight.

*Example 1*

52 parts of malonic acid and 80 parts of pyridine are dissolved in 250 parts of chloroform at 45° C. 188 parts of diethoxy-thiophosphoric acid chloride are allowed to flow in at this temperature while stirring well. It is stirred for another 5 hours at 50° C., allowed to cool and the reaction product shaken several times with water. The solvent is then distilled off and 162 parts of the new compound having the formula:

$$\begin{array}{c} C_2H_5O \phantom{xx} S \phantom{xxxxxxxxxxxxxx} S \phantom{xx} OC_2H_5 \\ \phantom{C_2H_5O} \diagdown \| \phantom{xxxxxxxxxxxxx} \| \diagup \\ \phantom{C_2H_5O} P-O-C-CH_2-C-O-P \\ \phantom{C_2H_5O} \diagup \phantom{xx} \| \phantom{xxxxxxxxx} \| \phantom{xx} \diagdown \\ C_2H_5O \phantom{xxxx} O \phantom{xxxxxxx} O \phantom{xxxx} OC_2H_5 \end{array}$$

are obtained as a brown oil with very strong insecticidal action which is distillable only with partial decomposition.

*Example 2*

By working as in Example 1 but using only 94 parts of diethoxy-thiophosphoric acid chloride instead of 94 parts thereof, there are obtained 59 parts of the mono-substitution product of malonic acid with the formula $C_7H_{13}O_8SP$ as a yellowish oil which also has very good insecticidal properties.

*Example 3*

44 parts of glutaric acid and 53 parts of pyridine are dissolved in 250 parts of chloroform. Then 126 parts of diethoxy-thiophosphoric acid chloride are then allowed to run in at room temperature and the temperature kept for another 5 hours at 50° to 55° C. It is allowed to cool, worked up as described in Example 1 and a new compound obtained having the formula:

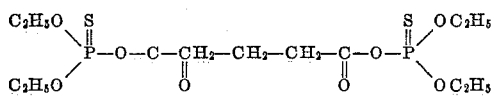

as a yellow oil which it is difficult to distil. The yield amounts to 120 parts.

*Example 4*

118 parts of succinic acid are dissolved in a mixture of 130 parts of anhydrous pyridine and 200 parts of benzene and then at room temperature and while stirring 188 parts of ortho.ortho'-diethoxy-thiophosphoric acid chloride are slowly added. When the whole has been added it is further stirred for 5 hours at 50° C. and then the bulk of the solvent mixture is distilled off under a good vacuum. The residue is taken up in 200 parts of benzene and washed several times with water. After drying, the solvent is distilled off under reduced pressure. As a residue there are obtained 143 parts of a red-brown oil, incapable of being distilled without decomposition, which according to analysis has the formula:

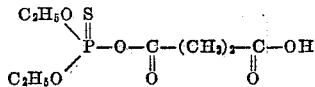

and exhibits very strong insecticidal action.

*Example 5*

48.5 parts of adipic acid are dissolved in 250 parts of chloroform and 66.5 parts of pyridine at 50° C. At this temperature 63 parts of diethoxy-thiophosphoric acid chloride are allowed to flow in, stirred for another 5 hours at 50° C., allowed to cool and worked up as described in Example 1. The yield amounts to 71 parts of a brownish non-distillable oil of the formula:

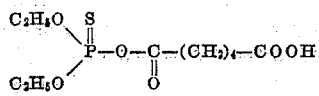

which has good insecticidal properties.

*Example 6*

360 parts of dimethylmalonic acid and 237 parts of pyridine are dissolved in 500 parts of dimethylformamide. Then 564 parts of diethoxy-thiophosphoric acid chloride are allowed to flow in at temperatures below 45° C. and stirred further for 4 hours at 45° to 50° C. The dimethylformamide is distilled off under reduced pressure, the residue taken up in methylene chloride, shaken several times with water, dried and the solvent distilled off under reduced pressure. A compound having the formula $C_9H_{17}O_6SP$ as a yellowish oil is obtained. The yield amounts to 564 parts.

*Example 7*

45.9 parts of alpha-methylglutaric acid are dissolved in 70 parts of pyridine. Then 56.4 parts of diethoxy-thiophosphoric acid chloride are then allowed to flow in and the whole stirred for 5 hours at 50° C. It is allowed to cool, 150 parts of chloroform are added, shaken several times with water, the organic layer dried and the solvent distilled off under reduced pressure. 68 parts of a non-distillable oil of the formula $C_{10}H_{19}O_6SP$ and having very good insecticidal properties are obtained.

*Example 8*

43.8 parts of adipic acid are dissolved in 50 parts of dimethylformamide, 47.4 parts of pyridine and then 130 parts of dipropoxy-thiophosphoric acid chloride are allowed to flow into the solution at a temperature of 20° to 30° C. while stirring. The solution is stirred for another 5 hours at 45° to 55° C. and the solvent distilled off under reduced pressure. The residue is taken up in methylene chloride and shaken three times with 100 parts of water. The organic layer is dried and the methylene chloride distilled off under reduced pressure. The residue obtained consists of 102 parts of a yellowish oil of the formula $C_{18}H_{36}O_8P_2S_2$, which exhibits good insecticidal action.

*Example 9*

43.8 parts of adipic acid are dissolved in 50 parts of dimethylformamide. 23.7 parts of pyridine and then 73.2 parts of dibutoxy-thiophosphoric acid chloride are allowed to flow into the solution while stirring. The solution is stirred for another 5 hours at 45° to 55° C. and the solvent distilled off under reduced pressure. The residue is taken up in 200 parts of methylene chloride, shaken with water, the organic phase dried, and the methylene chloride distilled off under reduced pressure. There are obtained 95 parts of a brown oil of the composition $C_{14}H_{27}O_6PS$, which solidifies when allowed to stand for some time.

We claim:
1. The compound of the formula:

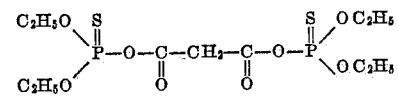

2. The compound of the formula:

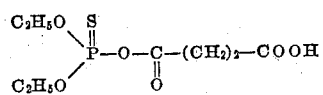

3. The compound of the formula:

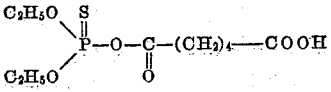

4. A process for the production of insecticidal compounds which comprises reaction of a compound of the general formula

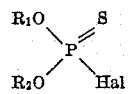

in which $R_1$ and $R_2$ represent lower alkyl radicals and Hal represents a halogen atom with a dicarboxylic acid of the general formula

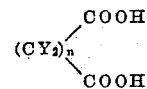

in which Y represents a member selected from the group consisting of hydrogen, halogen and an alkyl radical with one to four carbon atoms and $n$ represents a whole number from 0 to 6 at a temperature of from minus 10° C. to plus 120° C.

5. A process as claimed in claim 4 wherein the reaction is carried out in the presence of an agent which binds hydrogen halide.

6. A process as claimed in claim 5 wherein the reaction is carried out in the presence of a solvent.

References Cited in the file of this patent

UNITED STATES PATENTS

| 2,574,554 | Fischer | Nov. 13, 1951 |
| 2,625,536 | Kirby | June 13, 1953 |

OTHER REFERENCES

Richter: Textbook of Organic Chemistry (1938 edition), pages 181 and 9, John Wiley & Sons, Inc., New York, N.Y.

UNITED STATES PATENT OFFICE
CERTIFICATION OF CORRECTION

Patent No. 3,031,488            April 24, 1962

Heinz Pohlemann et al.

It is hereby certified that error appears in the above numbered patent requiring correction and that the said Letters Patent should read as corrected below.

Column 3, lines 16 to 19, the formula should appear as shown below instead of as in the patent:

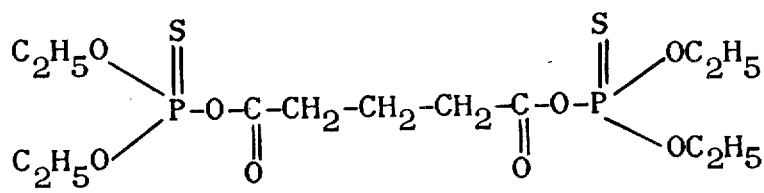

Signed and sealed this 25th day of September 1962.

(SEAL)
Attest:

ERNEST W. SWIDER            DAVID L. LADD

Attesting Officer            Commissioner of Patents